United States Patent
Liljeström et al.

(10) Patent No.: US 7,680,508 B2
(45) Date of Patent: Mar. 16, 2010

(54) DATA TRANSMISSION IN MOBILE COMMUNICATION SYSTEM

(75) Inventors: Henrik Liljeström, Helsinki (FI); Esa Malkamäki, Espoo (FI)

(73) Assignee: Nokia Corporation, Espoo (FI)

( * ) Notice: Subject to any disclaimer, the term of this patent is extended or adjusted under 35 U.S.C. 154(b) by 885 days.

(21) Appl. No.: 11/071,045

(22) Filed: Mar. 3, 2005

(65) Prior Publication Data

US 2006/0148507 A1   Jul. 6, 2006

(30) Foreign Application Priority Data

Jan. 5, 2005   (FI) ................................. 20055009

(51) Int. Cl.
*H04B 1/00*   (2006.01)

(52) U.S. Cl. .................. 455/522; 455/452.1; 455/452.2

(58) Field of Classification Search .................. 455/91, 455/127.1, 39, 68, 69, 500, 507, 517, 522, 455/452.1, 452.2, 434

See application file for complete search history.

(56) References Cited

U.S. PATENT DOCUMENTS

| | | | | |
|---|---|---|---|---|
| 5,426,689 A * | 6/1995 | Griffith et al. | ............. | 455/575.2 |
| 5,598,459 A * | 1/1997 | Haartsen | ..................... | 455/411 |
| 5,740,534 A * | 4/1998 | Ayerst et al. | ................ | 340/7.42 |
| 5,839,075 A * | 11/1998 | Haartsen et al. | ............. | 455/450 |
| 6,018,665 A * | 1/2000 | Chavez et al. | ................ | 455/462 |
| 6,172,968 B1 * | 1/2001 | Rasanen | ..................... | 370/329 |
| 6,931,026 B1 * | 8/2005 | Lee et al. | ..................... | 370/468 |
| 7,356,004 B2 * | 4/2008 | Yano et al. | .................. | 370/334 |
| 7,359,706 B2 * | 4/2008 | Zhao | ........................... | 455/436 |
| 7,447,515 B2 * | 11/2008 | Han et al. | .................... | 455/522 |
| 7,463,631 B2 * | 12/2008 | Bao et al. | .................... | 370/394 |
| 2002/0172217 A1 * | 11/2002 | Kadaba et al. | ............. | 370/443 |
| 2004/0127221 A1 | 7/2004 | Takano et al. | | |

FOREIGN PATENT DOCUMENTS

| | | | | |
|---|---|---|---|---|
| CA | 2483186 | * | 10/2004 | ................ 455/522 |
| EP | 1 313 231 A1 | | 5/2003 | |
| EP | 1 414 200 A1 | | 4/2004 | |
| EP | 1 542 375 A1 | | 6/2005 | |
| KR | 2003-0039850 | | 5/2003 | |
| KR | 2004-0036622 | | 4/2004 | |
| WO | WO 02/080418 A1 | | 10/2002 | |

OTHER PUBLICATIONS

Official communication issued in the corresponding Korean Application No. 10-2007-7015375, mailed Nov. 5, 2008.

* cited by examiner

*Primary Examiner*—Walter Benson
*Assistant Examiner*—David S Luo
(74) *Attorney, Agent, or Firm*—Squire, Sanders & Dempsey, LLP

(57) ABSTRACT

A transmitter is included in a mobile communication network. The transmitter is included configured to transmit to a receiver a data channel and a first control channel controlling data transmissions on the data channel, transmit, on the first control channel, an indicator indicating that there is data transmission to the receiver on the data channel. The transmitter also is configured to omit data transmission on the data channel.

39 Claims, 5 Drawing Sheets

DATA TRANSMISSION IN MOBILE COMMUNICATION SYSTEM

FIELD

The invention relates to power control of a control channel in a mobile communication network.

BACKGROUND

High speed downlink packet access (HSDPA) is wideband code division multiple access (WCDMA) key feature which provides high data rate transmission in a CDMA downlink to support multimedia services. Downlink data transmission is provided by a high speed physical shared control channel for HS-DSCH (HS-SCCH) and a high speed physical downlink shared channel (HS-DSCH) associated to the control channel. The control channel provides a terminal with information that data for the terminal is arriving on the data channel.

Prior to data transmission on the data channel, the prior art introduces no power control mechanism for the control channel. Only when data transmission has started, power of the control channel can be adjusted by applying either an open or a closed power control mechanism.

One of the disadvantages in the prior art is that the initial power level applied for the HS-SCCH is not optimal in view of interference in the network. The network may apply for a new user a safe average power level, which may be unnecessarily high. The uncertainty of the power level for the HS-SCCH may also imply a too high power level for a corresponding uplink control channel, that is high speed dedicated physical control channel HS-DPCCH associated with a HS-DSCH transmission in DL. The disclosed problem applies in prior art to the uplink transmission as well, and there is no power control mechanism for a control channel before data transmission on an associated data channel. The prior art also has the problem that the outer loop of the power control is slow. The problem is that the BLER (Block Error Rate) target of the HS-SCCH is small; hence very little errors occur that can be used in the power control. When the HS-PDSCH is transmitted, one cannot increase the errors on HS-SCCH, as they would automatically cause the data transmission to be unnecessary.

SUMMARY

It is thus an object of the present invention to provide improved power control for a control channel in a mobile communication network.

In one aspect of the invention, there is provided a transmitter for a mobile communication network, the transmitter being configured to transmit to a receiver a data channel and a first control channel controlling data transmissions on the data channel, transmit on the first control channel an indicator indicating that there is data transmission to the receiver on the data channel. The transmitter is configured to omit data transmission on the data channel.

In another aspect of the invention, there is provided a transmitter for a mobile communication network, including means for transmitting to a receiver a data channel and a first control channel controlling data transmissions on the data channel, the transmitting means being configured to transmit on the first control channel an indicator indicating that there is data transmission to the receiver on the data channel. The transmitting means is configured to omit data transmission on the data channel.

In another aspect of the invention, there is provided a transmitter for a mobile communication network, the transmitter being configured to transmit to a receiver a data channel and a first control channel controlling data transmissions on the data channel. The transmitter is configured to transmit on the first control channel an indicator indicating that there is no data transmission to the receiver on the data channel.

In still another aspect of the invention, there is provided a receiver of a mobile communication network, the receiver being configured to communicate with a transmitter on a first control channel and on a data channel associated to the first control channel and on a second control channel, wherein the first and second control channels are in different link directions, receive on the first control channel an indicator relating to data transmission on the data channel, monitor data transmission on the data channel. The receiver is configured to transmit a response on the second control channel if the data transmission on the data channel is omitted.

In still another aspect of the invention, there is provided a receiver of a mobile communication network, including means for communicating with a transmitter on a first control channel, a data channel associated to the first control channel and a second control channel, wherein the first and second control channels are to different link directions, means for receiving on the first control channel an indicator relating to data transmission on the data channel, means for monitoring data transmission on the data channel. The receiver includes means for transmitting a response on the second control channel if the indicator indicates that there is no data for the receiver on the data channel.

In still another aspect of the invention, there is provided a mobile communication system, including a transmitter and a receiver communicating on a first control channel, a data channel associated to the first control channel and a second control channel, wherein the first and second control channels are to different link directions, wherein the transmitter includes means for transmitting on the first control channel an indicator relating to data transmission on the data channel. The transmitter includes means for omitting data transmission on the data channel, and the receiver includes means for transmitting a response on the second control channel if the indicator on the first control channel is received, and the transmitter includes means for controlling power of the first control channel on the basis of the response or absence of a response transmitted on the second control channel.

In still another aspect of the invention, there is provided a method in a mobile communication network, including steps of communicating on a first control channel, a data channel associated to the first control channel and a second control channel, wherein the first and second control channels are to different link directions, transmitting on the first control channel an indicator relating to data transmission on the data channel. The method further includes steps of omitting data transmission on the data channel, transmitting a response on the second control channel if the indicator on the first control channel is received, controlling power of the first control channel on the basis of the response or absence of a response transmitted on the second control channel.

In still another aspect of the invention, there is provided a software product, including software code portions for implementing the steps of communicating on a first control channel and a data channel associated to the first control channel, transmitting on the first control channel an indicator relating to data transmission on the data channel. The software product includes a software code portion for implementing the step of omitting data transmission on the data channel.

The invention relates to a power control mechanism of a control channel in a mobile network. The mobile network according to the invention can be Universal Mobile Telephony System (UMTS) employing Wideband Code Division Multiple Access (WCDMA) radio technology, for instance. The invention can be applied in a network employing High Speed Downlink Packet Access (HSDPA) or High Speed Uplink Packet Access (HSUPA), for instance.

In the invention, there is provided a connection between a transmitter and a receiver. In one embodiment, the transmitter is a base station of a mobile network, or with reference to UMTS, a Node B. In that case the receiver can be a mobile terminal that is in connection with the network. In another aspect of the invention, a transmitter is a mobile terminal and a receiver is a base station/Node B. The mobile terminal can be a mobile phone or a lap-top computer, for instance.

In the invention, there is provided a first control channel, a data channel associated with the first control channel, and a second control channel. The second control channel is provided in a different link direction than the first control channel and the data channel. In one embodiment, the first control channel and the data channel are provided in downlink direction and the second control channel in uplink direction. In another embodiment, the first control channel and the data channel are provided in uplink direction and the second control channel in downlink direction.

With reference to UMTS employing HSDPA, the first control channel can be HS-SCCH, the data channel can be HS-DSCH, and the second control channel can be HS-DPCCH.

In one aspect of the invention, the transmitter transmits an indicator on the first control channel wherein the indicator relates to data transmission on the associated data channel. In one embodiment, the indicator informs the receiver that there is no data transmission on the data channel. Upon the indication, the receiver transmits a response containing a positive or negative acknowledgement. If the transmitter receives the response, it can lower the power level on the first control channel. By contrast, if the transmitter does not receive a response, it can adjust the power level higher on the first control channel.

The invention provides an efficient manner to adjust power of a control channel that is associated to a data channel before data transmission on the data channel. Furthermore, the invention provides a possibility for fast power control of a control channel in a packet data network.

DRAWINGS

In the following the invention will be described in greater detail by means of preferred embodiments with reference to the attached drawings, in which FIG. 1 is one embodiment of a network according to the invention;

EMBODIMENTS

Figure 1:
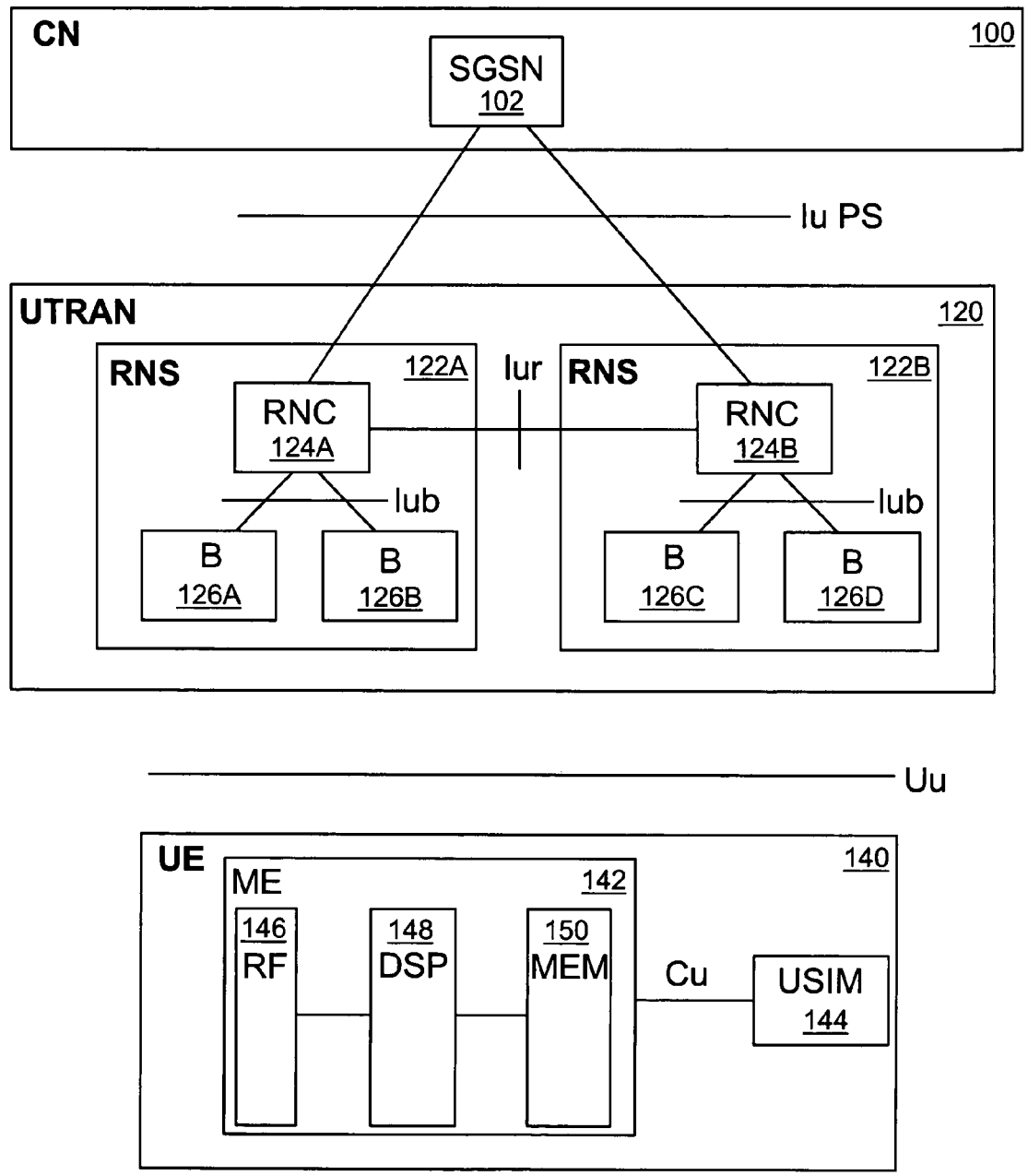

In one embodiment of the invention, the network is a UMTS network applying WCDMA technology. In the following, the structure of the UMTS network is shortly discussed with reference to FIG. 1.

The WCDMA can structurally be divided into a core network (CN) 100, a UMTS terrestrial radio access network (UTRAN) 120, and user equipment (UE) 140. The core network and the UTRAN are part of the network infrastructure of the wireless telecommunications system.

The core network includes a serving GPRS support node (SGSN) 102 connected to the UTRAN over an Iu PS interface. The SGSN represents the center point of the packet-switched domain of the core network, and the main task of the SGSN is to transmit/receive packets to/from user equipment using the UTRAN. The SGSN may contain subscriber and location information related to the user equipment.

The UTRAN can include at least one radio network subsystem (RNS) 122A, 122B, each of which includes at least one radio network controller (RNC) 124A, 124B and at least one Node B 126A to 126D controlled by the RNC. The Node B implements the Uu radio interface, through which the user equipment may access the network infrastructure.

The user equipment or the mobile terminal may include two parts, which are mobile equipment (ME) 142 and a UMTS subscriber identity module (USIM) 144. The mobile equipment includes radio frequency parts 146 for providing the Uu-interface. The user equipment can further include a digital signal processor 148, memory 150, and computer programs for executing computer processes. The user equipment may further include an antenna, a user interface, and a battery. The USIM comprises user-related information and information related to information security, such as an encryption algorithm.

Figure 2:
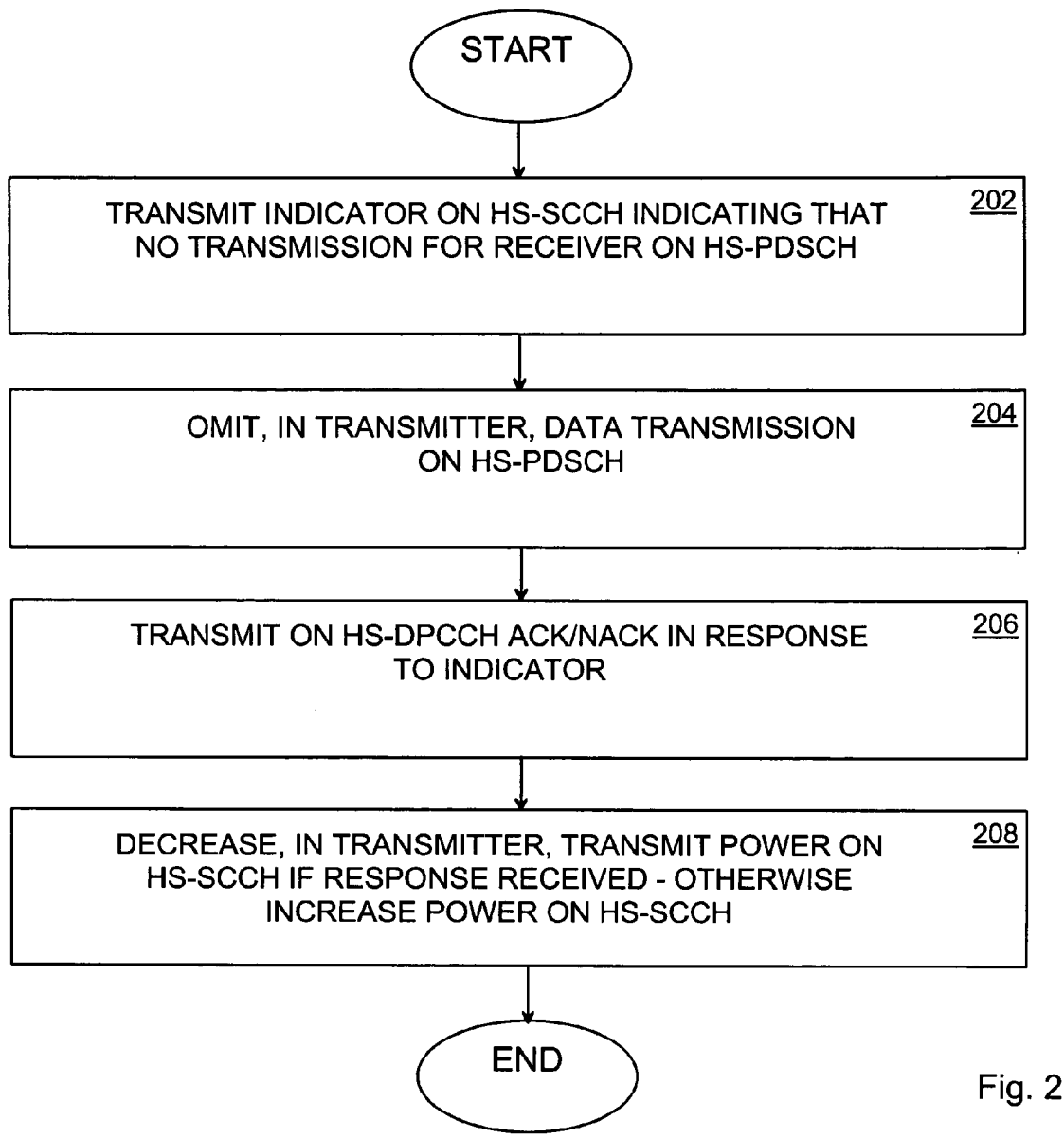
FIG. 2 illustrates one embodiment of a method.
Figure 3:
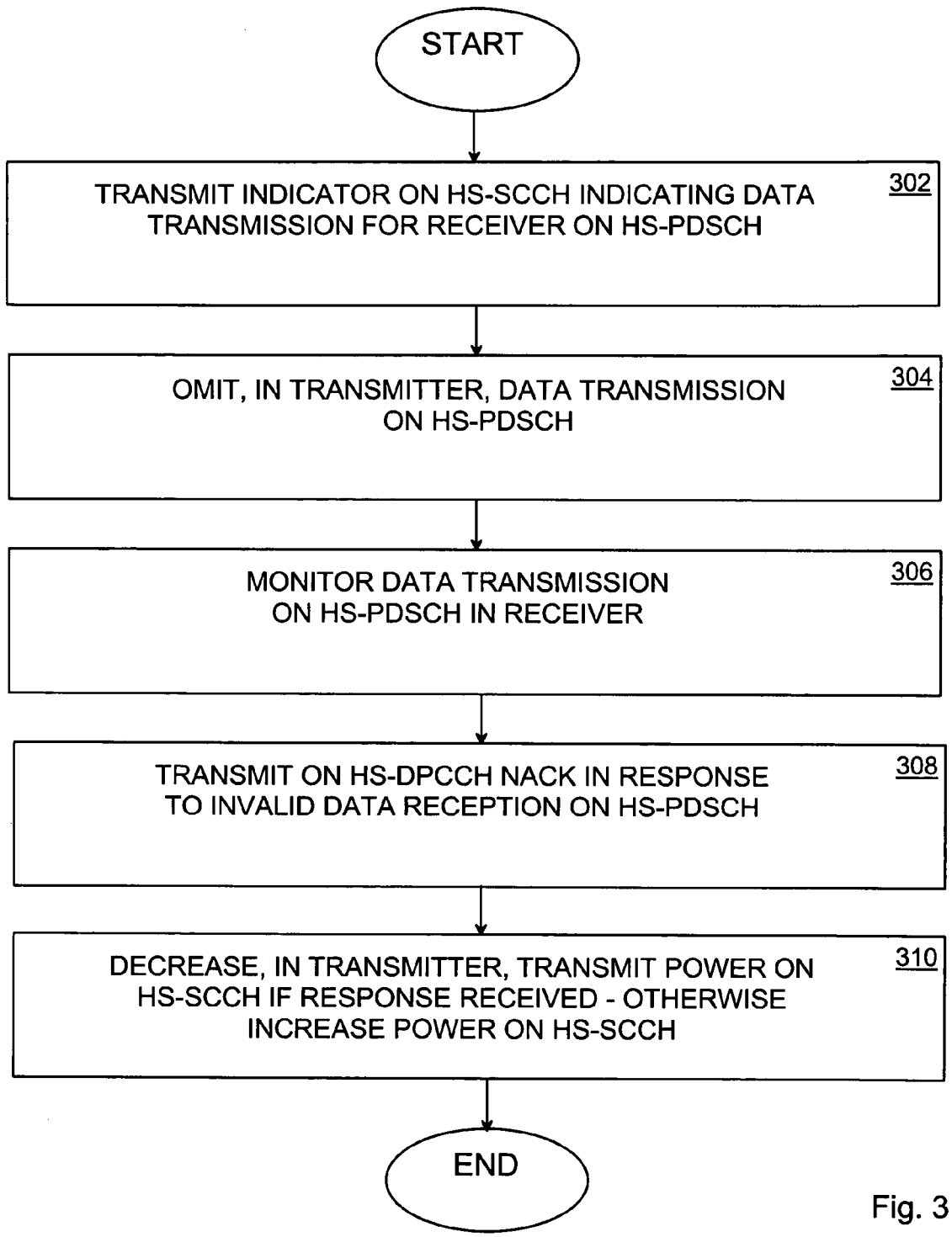
FIG. 3 illustrates another embodiment of a method.

FIGS. 2 and 3 illustrate embodiments of a method according to the invention. The figures refer to a transmitter and a receiver, which in the shown embodiments refer to a base station and a mobile terminal, respectively. Alternatively, the transmitter can be a mobile terminal and the receiver can be a network element, such as a base station.

At method start in FIG. 2, a mobile terminal (receiver) is in the coverage area of a mobile network and the terminal has an established connection with the network. In one embodiment of the invention, downlink data transmission on a data channel has not started before application of the method. In another embodiment, the method is applied during data transmission.

The connection between the network and the mobile terminal includes at least a downlink control channel, downlink shared data channel and an uplink control channel. The downlink control channel can be a shared channel conveying information to several mobile terminals. The information transmitted on the downlink control channel informs a mobile terminal that there is data arriving to the terminal on the data channel. The uplink control channel can as well be associated to the downlink data channel. The uplink channel can be used for transmitting a response to the network, whereby the response carries information on the quality of data reception on the data channel.

In 202, a base station of the mobile network transmits an indicator on the downlink control channel, the indicator including information that there is no data to the receiver on a data channel.

In one embodiment, the indication can be implemented so that the base station transmits to the mobile terminal information that the data length on the data channel is zero (0). In that case the transmitter can omit data transmission to the receiver, as shown in step 204. Upon reception of the indication that the data length is zero, the receiver does not need to monitor or decode the information received on the data channel. In the case of an HSDPA system, the indication that the data length is zero can be transmitted in a transport-block-size information field on an HS-SCCH channel.

In another embodiment, the information on the zero data length can be coded into a channelization-code-set information field. An unused bit pattern can be chosen so as to indicate the receiver that there is no data transmission for the receiver on the data channel. The channelisation-code-set is specified to be a 7 bit field which tells the number of channelisation codes used as well as the starting code (offset) for the set (TS 25.212). Currently, the following bit patterns are unused: 1110000, 1110001, 1110010, 1110011, 1110100, 1110101, 1110110, and 1110111. Thus one of those can be used to indicate that no data is being transmitted.

In 204, the transmitter omits transmission to the user on the data channel, as indicated by the indicator transmitted on the control channel.

In 206, the receiver generates a Negative acknowledgement (NACK) or an Acknowledgement (ACK) in response to the indicator received on HS-SCCH. The response can, in the case of HSDPA, be included into HARQ-ACK field on an HS-DPCCH channel, for instance. Selection between ACK and NACK can be made depending on the implementation. ACK is typically transmitted on a higher power level than NACK in HSDPA.

If the indicator on HS-SCCH is transmitted on a power level so low that a receiver does not receive the information, the receiver cannot respond with ACK/NACK.

In 208, the transmitter monitors the uplink control channel, which can be HS-DPCCH, for instance. If the transmitter receives the response from the receiver, the transmitter knows that the receiver was able to receive HS-SCCH correctly. Thereby, the power level on HS-SCCH may be unnecessarily high in view of having minimum interference in the network. In 208, the power level on the first control channel can be reduced if a response is received from the receiver. On the other hand, if the transmitter does not receive a response from the receiver at the expected moment of time, the transmitter can control (increase, for instance) the power level on the HS-SCCH.

FIG. 3 discloses another embodiment of the method according to the invention.

In step 302, the operation of the transmitter corresponds to the operation of a transmitter in prior art, that is, the transmitter indicates to the receiver on a first control channel that there is data transmission to the receiver on the data channel. In HSDPA the receiver can identify by using the UE specific CRC attachment in HS-SCCH that the data was intended for it. (3 GPP 25.212-5904.6)

In one embodiment, the transmitter alternates between the values of the "new data indicator" (NDI) transmitted on the HS-SCCH. NDI is a one-bit long sequence number, which is always increased by 1 when transmission of new data is started. The NDI can be 0 for the first packet, 0 for a retransmission, 1 for a new data transmission, and again 0 for a new data transmission. If HS-SCCH parameters are valid, the terminal tries to decode data by using the received parameters and probably fails if no data has been transmitted by the Node B in the data field.

However, as shown by step 304, the transmitter omits data transmission on the data channel.

As shown by step 306, the receiver expects data to arrive on the data channel and correspondingly monitors data flow on the data channel. In case of HSDPA transmission, the transmission on the control channel and on the data channel can be separated by two time slots' duration. The receiver can perform a CRC (Cyclic Redundancy Check) on the data received on the HS-PDSCH. The CRC will fail, as the transmitter omitted the HS-PDSCH transmission and the receiver can conclude that the data on HS-DPSCH was not correctly received. Thus, even if nothing is transmitted on data channel (HS-PDSCH) (step 306), a NACK response is forced from the receiver.

In 308, when the expected arrival moment of the data has passed in a receiver, the receiver can conclude that the data transmission was not correctly received. Hence, the receiver will transmit a NACK in response to the incorrectly received data transmission. Here the NACK needs to be transmitted on a power level so high that it can be distinguished from a discontinuous transmission (DTX) in the transmitter. The transmitter can then, according to 310, increase power on HS-SCCH if no response is received from the receiver and decrease power on HS-SCCH if a response is received.

In another embodiment of the method of FIG. 3, a transmitter such as a base station transmits on a first control channel a broadcast message, which is receivable in several receivers. The broadcast message can include information that there is data to the receivers on the data channel. The transmitter, however, omits transmission on the data channel. Each receiver that received the message on the first control channel can respond on a second control channel. Thereby the transmitter of the network can obtain information from several receivers simultaneously and the transmit power of some of the channels of the network can be controlled.

Alternatively, the broadcasting to the receivers can be implemented so that the transmitter indicates in a broadcast message that there is no transmission on the data channel. All the receivers that receive the broadcast message can respond with a NACK, for instance, whereby the network can control power of a transmit channel, for instance.

In addition to the embodiments disclosed in FIGS. 2 and 3, in still another embodiment, the transmitter can transmit an invalid parameter combination, for instance. The invalid parameter combination on HS-SCCH results to a failure in CRC check, whereby the receiver can transmit a response to the transmitter.

Figure 4:
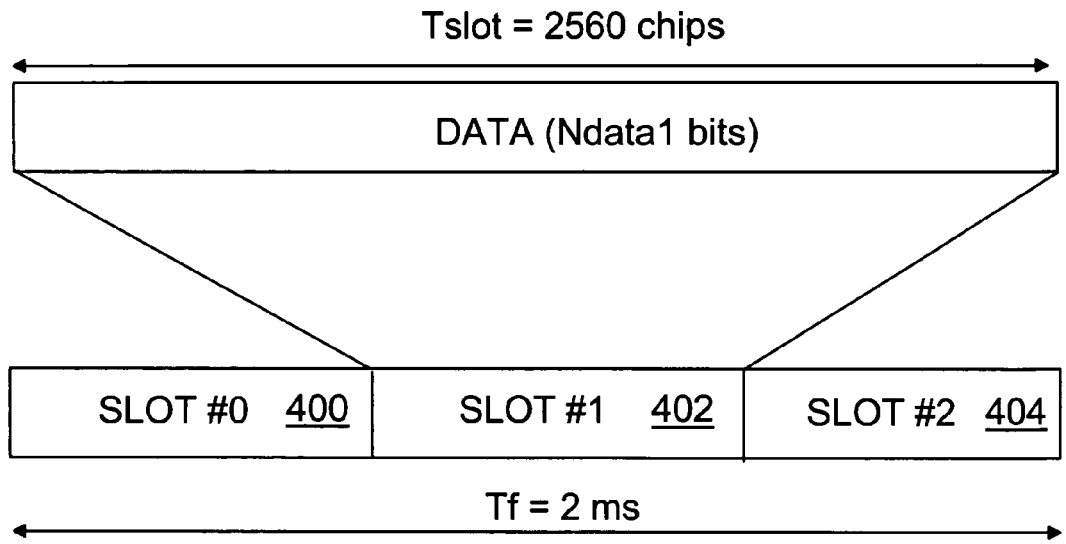
FIG. 4 shows the data structure of a channel.

FIG. 4 illustrates a subframe structure for an HS-SCCH, which is, in HSDPA, a fixed rate (60 kbps, spreading factor=128) downlink physical channel used to carry downlink signalling related to HS-DSCH transmission. The data structure of the High Speed Physical Downlink Shared Channel (HS-PDSCH), which is used to carry the High Speed Downlink Shared Channel (HS-DSCH), is similar to the frame structure of HS-SCCH.

Figure 5:
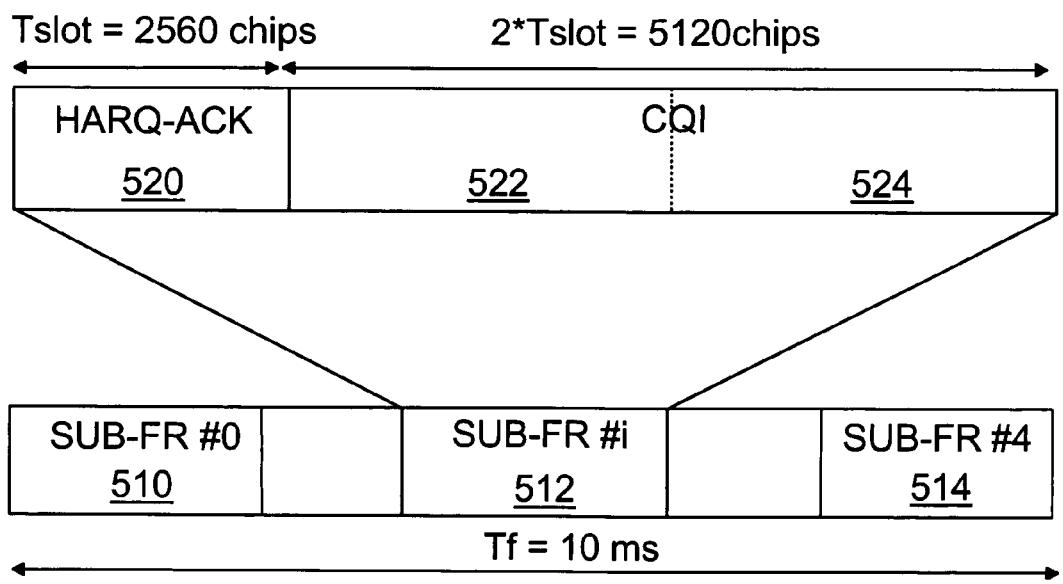
FIG. 5 shows the data structure of another channel.

FIG. 5 illustrates the frame structure of the HS-DPCCH. The HS-DPCCH carries uplink feedback signalling related to downlink HS-DSCH transmission. The HS-DSCH-related feedback signalling consists of Hybrid-ARQ Acknowledgement (HARQ-ACK) and Channel-Quality Indication (CQI). Each sub frame of the length of 2 ms (3*2560 chips) consists of 3 slots, each of the length of 2560 chips. The HARQ-ACK is carried in the first slot of the HS-DPCCH sub-frame. The CQI is carried in the second and third slot of an HS-DPCCH sub-frame. There is at most one HS-DPCCH for each UE. UE can monitor multiple HS-SCCH but there is just one HS-DPCCH per UE in HSDPA.

Figure 6:
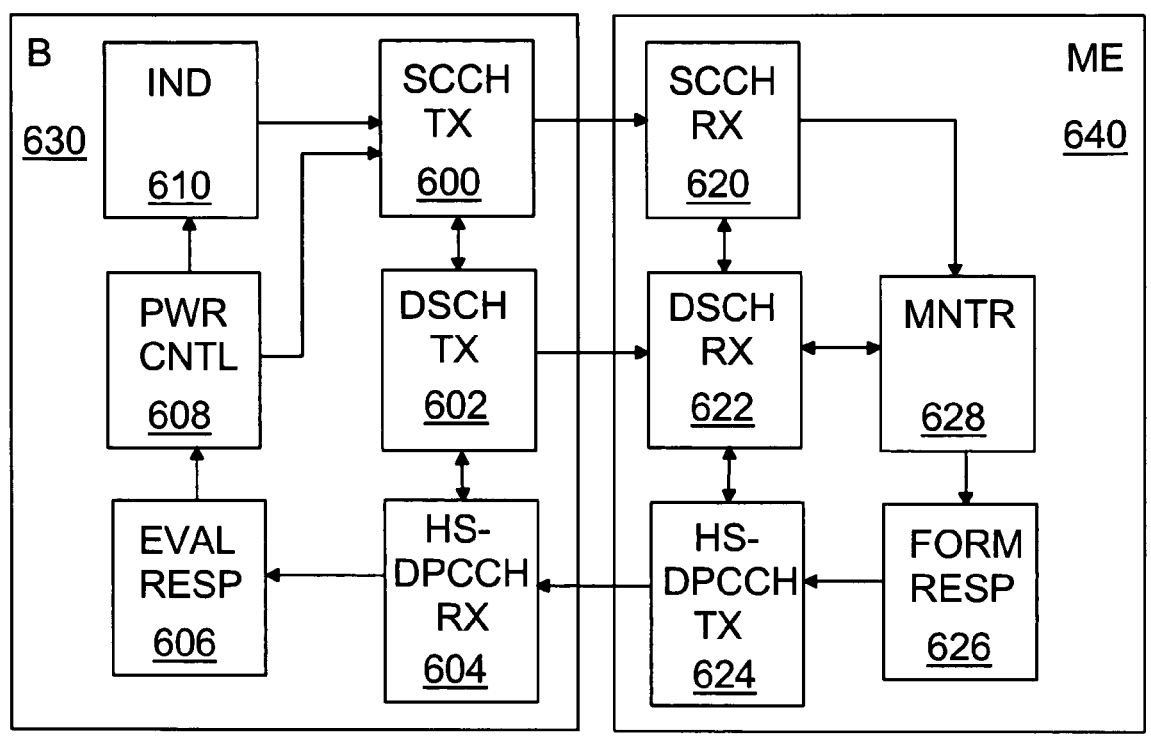
FIG. 6 shows one embodiment of an apparatus according to the invention.

FIG. 6 shows one embodiment of an apparatus according to the invention. In the embodiment of FIG. 6, a transmitter is a base station (B) and a receiver is mobile equipment (ME). The base station can include means for transmitting a first control channel 600, means for transmitting a downlink data channel 602 and means for receiving an uplink control channel 604. The transmissions on the control channels are dependent on transmission on the data channel, and thus the means 600 and 604 are connected to the means 602.

Correspondingly, the receiver (ME) can include means for receiving a first control channel 620, means for receiving a data channel 622 and means for transmitting a second control channel 624. The transmissions on the control channels are dependent on transmission on the data channel, and thus the means 620 and 624 are connected to the means 622.

Furthermore, the transmitter (B) can include means for forming an indicator 610, which can then be included in transmission on a first control channel. The transmitter can also include means for evaluating a response 606 received on a second control channel. If the response evaluating means 606 concludes that the receiver has successfully received transmission on the first control channel, the response evaluating means can order means for controlling power 608 to control, for instance to decrease power on the first control channel. Alternatively, upon order from the evaluating means 606, the power control means 608 can control power by increasing power on the first control channel.

The receiver (ME) can include means for monitoring and decoding 628 transmission on the first control channel. The monitoring means can receive an indicator on the first control channel and start monitoring the data channel upon reception of the indicator. If the receiver successfully receives the indicator on the first control channel and fails in reception on the data channel, the receiver can form a NACK response in a means for forming a response 626. The response forming means 626 in response form an ACK or a NACK, depending on the implementation.

The features of the invention can be implemented by software, ASIC (Application Specific Integrated Circuit), Logic Components or some corresponding manner.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
a processor operationally coupled to a transceiver, wherein the processor is configured to
control transmission, to a mobile terminal, on a data channel
control data transmissions on the data channel via a first control channel;
control reception, from the mobile terminal, on a second control channel;
process an indicator on the first control channel for transmission to the mobile terminal, the indicator being transmitted to the mobile terminal without an associated data transmission occurring on the data channel; and
process a response received on the second control channel when the indicator transmitted on the first control channel is received at the mobile terminal.

2. An apparatus as claimed in claim 1, wherein the apparatus further comprises a power controller to control power of the first control channel based on the response or an absence of the response received on the second control channel.

3. An apparatus as claimed in claim 2, wherein the power controller is configured to increase power on the first control channel if no response is received on the second control channel.

4. An apparatus as claimed in claim 2, wherein the power controller is configured to decrease power on the first control channel if the response is received on the second control channel.

5. An apparatus as claimed in claim 1, wherein the second control channel comprises a high speed dedicated physical control channel.

6. An apparatus as claimed in claim 5, wherein the response is coded into a hybrid automated repeat request parameter transmitted on the high speed dedicated physical control channel.

7. An apparatus as claimed in claim 1, wherein the processor is configured to process the indicator for transmission before the data transmission to the mobile terminal on the data channel has started.

8. An apparatus as claimed in claim 1, wherein the apparatus comprises a base station or a Node B and the mobile terminal comprises a mobile terminal.

9. An apparatus as claimed in claim 1, wherein the indicator is configured to indicate that the data channel contains no data transmission to the mobile terminal.

10. An apparatus as claimed in claim 9, wherein the indicator is further configured to indicate that the data transmission transmitted on the data channel has zero length.

11. An apparatus as claimed in claim 9, wherein the first control channel comprises a high speed shared control channel and the data channel comprises a high speed downlink shared channel in a high speed data packet access system.

12. An apparatus as claimed in claim 11, wherein a channelization code information is transmitted on the high speed shared control channel, and the indicator is coded into the channelization code information field.

13. An apparatus as claimed in claim 11, wherein a transport block size is transmitted on the high speed shared control channel, and the indicator indicates that the transport block size on the data channel is zero.

14. An apparatus as claimed in claim 11, wherein a Previously Presented data indicator is transmitted on the high speed shared control channel, and the processor is configured to alternate values of the Previously Presented data indicator in successive data blocks transmitted on the data channel.

15. An apparatus as claimed in claim 11, wherein a set of parameters defining transmission on the data channel is transmitted on the high speed shared control channel, the set of parameters including invalid information in view of data reception on the data channel.

16. An apparatus, comprising:
a processor operationally coupled to a transceiver, wherein the processor is configured to
control reception, from a base station, on a first control channel;
control reception of data transmissions, from a base station, on a data channel via the first control channel;
control transmission on a second control channel;
process an indicator received on the first control channel, the indicator being received without an associated data transmission occurring on the data channel; and
prepare a response to be transmitted on the second control channel when the indicator on the first control channel is received.

17. An apparatus as claimed in claim 16, wherein the first control channel and the data channel are in a downlink direction, and the second control channel is in an uplink direction.

18. An apparatus as claimed in claim 16, wherein the second control channel comprises a high speed dedicated physical control channel and the response is coded into a hybrid automated repeat request parameter transmitted on the second control channel.

19. An apparatus as claimed in claim 16, wherein the apparatus comprises a mobile terminal.

20. A method, comprising:
- communicating with a base station on a first control channel;
- controlling reception of data transmissions, from the base station, on a data channel via the first control channel;
- controlling transmission on a second control channel;
- receiving, on the first control channel, an indicator being received without an associated data transmission occurring on the data channel; and
- preparing a response to be transmitted on the second control channel when the indicator on the first control channel is received.

21. A method as claimed in claim 20, wherein the first control channel and the data channel are in a downlink direction, and the second control channel is in an uplink direction.

22. A method as claimed in claim 20, wherein the second control channel comprises a high speed dedicated physical control channel and the response is coded into a hybrid automated repeat request parameter transmitted on the second control channel.

23. A method as claimed in claim 20, wherein said method is performed by a mobile terminal.

24. A method, comprising:
- controlling data transmissions on a data channel via a first control channel;
- controlling reception, from a mobile terminal, on a second control channel;
- transmitting to the mobile terminal, on the first control channel, an indicator relating to data transmission on the data channel, the indicator being transmitted to the mobile terminal without an associated data transmission occurring on the data channel; and
- processing a response received on the second control channel when the indicator transmitted on the first control channel is received at the mobile terminal.

25. Method as claimed in claim 24, wherein power on the first control channel is increased if no response is received on the second control channel.

26. A method as claimed in claim 24, wherein power on the first control channel is decreased if the response is received on the second control channel.

27. A method as claimed in claim 24, wherein the second control channel comprises a high speed dedicated physical control channel.

28. A method as claimed in claim 27, wherein the response is coded into a hybrid automated repeat request parameter transmitted on the high speed dedicated physical control channel.

29. A method as claimed in claim 28, wherein the indicator is transmitted before starting data transmission on the data channel.

30. A method as claimed in claim 24, wherein the method if performed by a base station or a Node B.

31. A computer-readable medium having computer executable components for implementing a method comprising:
- controlling data transmissions on a data channel via a first control channel;
- controlling reception, from a mobile terminal, on a second control channel;
- transmitting to the mobile terminal, on the first control channel, an indicator relating to data transmission on the data channel, the indicator being transmitted to the mobile terminal without an associated data transmission occurring on the data channel; and
- processing a response received on the second control channel when the indicator transmitted on the first control channel is received at the mobile terminal.

32. An apparatus, comprising:
- transmitting means for transmitting, to a mobile terminal, on a data channel;
- controlling means for controlling data transmissions on the data channel via a first control channel;
- control receiving means for receiving transmissions from the mobile terminal on a second control channel;
- processing means for processing an indicator on the first control channel for transmission to the mobile terminal, the indicator being transmitted to the mobile terminal without an associated data transmission occurring on the data channel; and
- processing response means for processing a response received on the second control channel when the indicator transmitted on the first control channel is received at the mobile terminal.

33. An apparatus, comprising:
- controlling means for controlling reception, from a base station, on a first control channel;
- data controlling means for controlling reception, from the base station, of data transmissions on a data channel via the first control channel;
- transmission means for controlling transmission on a second control channel;
- processing means for processing an indicator received on the first control channel, the indicator being received without an associated data transmission occurring on the data channel; and
- preparing means for preparing a response on the second control channel when the indicator on the first control channel is received.

34. A method, comprising:
- receiving on a first control channel, from a base station, an indicator relating to data transmission on a data channel;
- monitoring the data channel to observe if any data transmission have occurred; and
- transmitting a response on a second control channel, to the base station, when it is observed that no data transmission has occurred on the data channel, despite the indicator on the first control channel indicating data transmission on the data channel.

35. A method as claimed in claim 34, wherein the first control channel and the data channel are in a downlink direction, and the second control channel is in an uplink direction.

36. A method as claimed in claim 34, wherein the second control channel comprises a high speed dedicated physical control channel and the response is coded into a hybrid automated repeat request parameter transmitted on the second control channel.

37. A method as claimed in claim 34, wherein the method is performed by a mobile terminal.

38. A method as claimed in claim 34, wherein said transmitting of the response occurs when the indicator indicates that no data transmission for the mobile terminal is on the data channel.

39. A computer-readable medium having computer executable components for implementing a method comprising:
- controlling reception of data transmissions, from a base station, on a data channel via a first control channel;
- controlling transmission on a second control channel;
- receiving, on the first control channel, an indicator being received without an associated data transmission occurring on the data channel; and
- preparing a response to be transmitted on the second control channel when the indicator on the first control channel is received.

* * * * *